No. 754,311. PATENTED MAR. 8, 1904.
T. G. HYDE.
MEANS FOR FACILITATING INTERLEAVING SHEETS.
APPLICATION FILED OCT. 9, 1903.
NO MODEL.
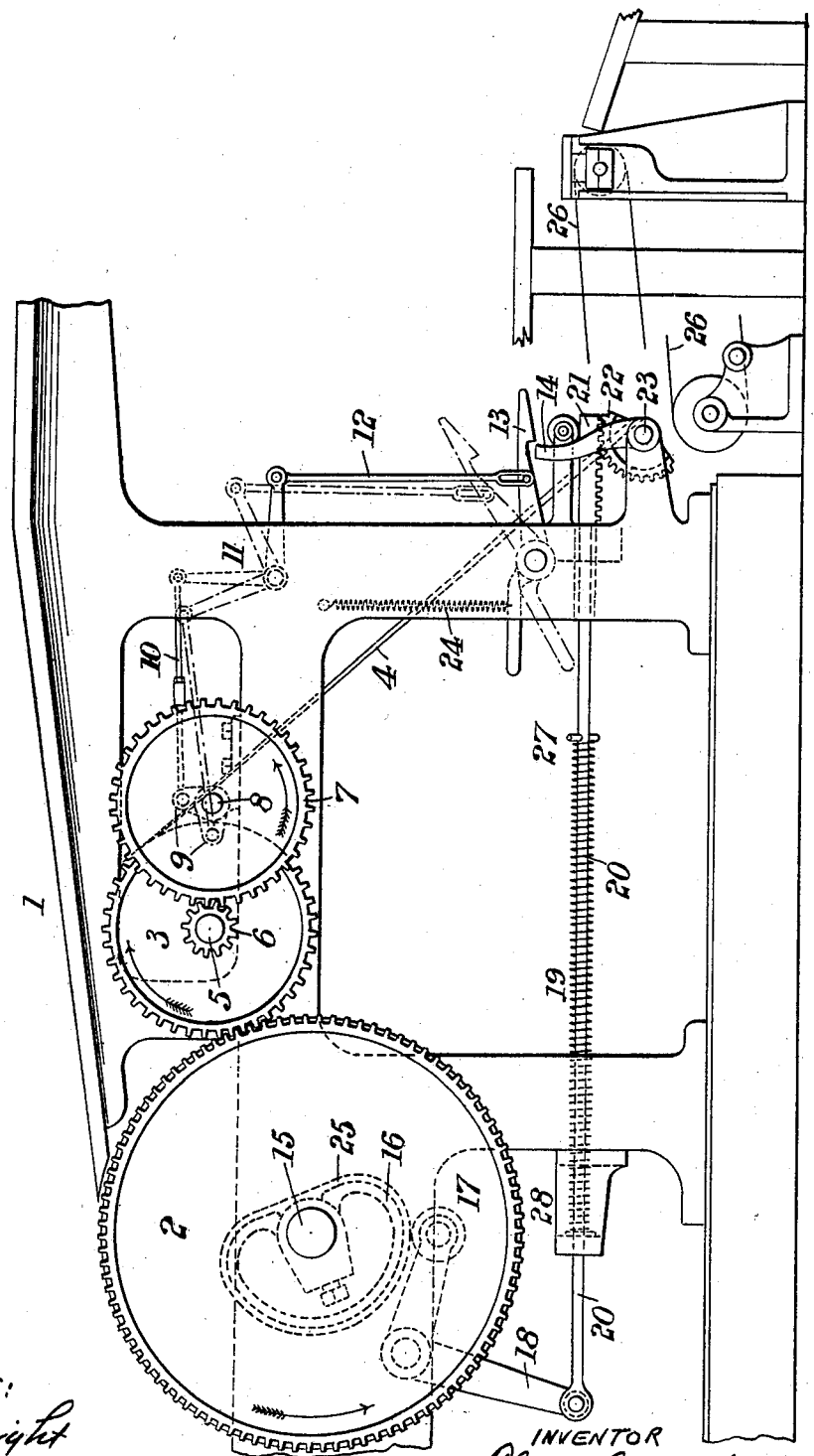
WITNESSES:
G. W. Wright
E. W. Collins
INVENTOR
Thomas George Hyde
BY Howson and Howson
HIS ATTORNEYS.

No. 754,311. Patented March 8, 1904.

UNITED STATES PATENT OFFICE.

THOMAS GEORGE HYDE, OF LONDON, ENGLAND, ASSIGNOR TO GILBERT HINDS WHITEHEAD, OF NEW ELTHAM, ENGLAND.

MEANS FOR FACILITATING INTERLEAVING SHEETS.

SPECIFICATION forming part of Letters Patent No. 754,311, dated March 8, 1904.

Application filed October 9, 1903. Serial No. 176,424. (No model.)

*To all whom it may concern:*

Be it known that I, THOMAS GEORGE HYDE, engineer, a subject of the King of Great Britain and Ireland, residing at 57° Hatton Garden, in the city of London, England, have invented certain new and useful Improvements in Means for Facilitating Interleaving Sheets, of which the following is a specification.

My invention has for its object to provide in connection with printing-machines means for facilitating interleaving (with tissue or plain paper) sheets delivered from printing-machines and printed on one side only, the printed sheets being mechanically manipulated according to my invention in such a manner that an interleaving sheet is only required between every alternate opposed faces of the printed sheets without the necessity for turning over every alternated printed sheet by hand. To effect this, means are provided according to my invention whereby the printed sheets delivered from the printing-machine are mechanically deposited alternately in reverse positions, so that they are in pairs, back to back, and only require interleaving between the printed faces presented toward each other. For effecting this the flier onto which the printed sheets pass as they leave the printing-machine is operated so as to reverse only each alternate printed sheet leaving the printing-machine, the flier being inoperative at every other delivery of printed sheets, so that it does not reverse these printed sheets. An interleaving sheet being first placed on the collecting-table, a printed sheet from the printing mechanism passes with its printed face downward onto the flier, and the said flier is not operated, and so the said printed sheet passes onto the interleaving sheet face downward. After the second printed sheet passes from the printing-machine the flier is operated and reverses this second printed sheet, so that it is conveyed to and deposited on the previously-deposited printed sheet with the printed face uppermost, and as the unprinted face of this second sheet is presented to the unprinted face of the printed sheet previously deposited no interleaving sheet is needed between these unprinted faces. An interleaving sheet is then placed on the printed face of the second printed sheet, and then the next printed sheet passes from the printing-machine, and the flier is not operated to reverse this third printed sheet, which is therefore deposited face downward onto the interleaving sheet, and so on. Traveling tapes may be used for conveying the printed sheets to the collecting-table, and the interleaving sheets may be placed in position by hand.

The accompanying drawing illustrates in side elevation so much of a printing-machine as is necessary to illustrate the application of my invention thereto, it being understood, however, that I do not restrict myself to the precise arrangement of mechanism illustrated.

The sheets to be printed are fed from the table 1 onto the impression-cylinder 2 and are carried thereby between the said impression-cylinder and the form or printing-cylinder, (not shown in the drawing,) by which the sheets are printed on one side only. The printed sheets pass from the impression-cylinder 2 onto the delivery-roller 3 and thence onto the flier 4. The impression-cylinder 2 and the delivery-roller 3 are rotated by gearing in the direction indicated by the arrows, each printed sheet being delivered by the roller 3 onto the flier 4 with its printed face downward. The gearing connecting the impression-cylinder 2 to the delivery-roller 3 is so arranged that the delivery-roller 3 makes two rotations to each rotation of the impression-cylinder 2. On the axle 5 of the delivery-roller 3 is a pinion 6 in gear with a spur-wheel 7 on a a shaft 8, carrying a crank 9, connected by a rod 10 to one arm of a bell-crank lever 11, the other arm of which is connected by a rod 12 to a spring-actuated latch or stop 13, arranged so that when depressed it can engage with an arm 14, keyed to the axle 23 of the flier 4, so as then to prevent the action of the flier 4. On the shaft 15 of the impression-cylinder 2 is a cam 16, with which a friction-roller 17, carried on one arm of a bell-crank lever 18, is maintained in contact by a spring 19, surrounding a rod 20 and bearing at one end on a projection 27 from the said rod and at the other end on a fixed part 28 of the frame through which the rod 20 passes. The rod 20 is connected at one end to the lower arm of the bell-crank-lever 18 and its other end is provided with rack-teeth 21 in gear with a toothed segment 22, fast on the axle 23 of the flier 4.

When the parts are in the position shown in the drawing, a printed sheet on the impression-cylinder 2 is about to pass therefrom onto the delivery-roller 3, and while the impression-cylinder 2 is making one-half of a rotation in the direction of the arrow and the concentric portion of the cam 16 is in contact with the friction-roller 17 the delivery-roller 3 will have made a complete rotation and delivered the printed sheet with its printed face downward onto the flier 4. The pinion 6 on the axle 5 of the delivery-roller 3 will at the same time have imparted one-fourth of a rotation to the crank-shaft 8, whereby the catch 13 is raised against the counteracting power of the spring 24 into the position shown by dot-and-pick lines. While the impression-cylinder 2 is making the next half-rotation another sheet is being printed between the form or printing-cylinder and the impression-cylinder 2, and the straight portion 25 of the cam 16 is opposite the friction-roller 17 on the bell-crank lever 18, so as to first allow the rod 20 under the action of the spring 19 to move to the right and through the rack-teeth 21 and toothed segment 22 actuate the flier 4, so as to lay the printed sheet on the endless traveling tapes 26, with its printed face upward, and then by the succeeding part of the flat portion of the cam 16, acting on the roller 17 and moving the rod 20 to the left, the flier is raised into the position shown in the drawing to receive the next printed sheet from the delivery-roller 5. While this action is taking place the bell-crank lever 11, rod 12, and latch 13 will be returned to the position shown in the drawing, the crank 9, however, being then in the reverse position to that shown—that is, with the crank-pin below the axis 8. During this movement another sheet will have been printed, and while the impression-cylinder 2 is now making one half-rotation the printed sheet carried thereby will be delivered by the delivery-roller 3 onto the flier 4, and owing to the position of the crank 9, rod 10, and bell-crank lever 11 the catch 13 can descend under the action of the spring 24 and engage the arm 14 on the axle of the flier 4, and thus prevent the rod 20 from being moved by the spring 19, and consequently the flier will not be operated while the impression-cylinder is making the next half-rotation. The printed sheet which has last passed onto the flier with its printed face downward will thus slide down the flier onto the endless traveling tapes 26 and be conducted thereby, printed face downward, onto the interleaving sheet which has been placed over the printed sheet which was previously conducted to the collecting-table with its printed face upward. The next printed sheet like that first described will be delivered by the flier face upward onto the traveling tapes 26 and be conducted thereby with its unprinted surface downward onto the unprinted upper face of the printed sheet previously conducted to the collecting-table.

The printed sheets as they pass from the printing-machine are thus delivered to the collecting-table alternately with their printed faces alternately upward and downward, so that each two alternate sheets so delivered only require to have an interleaving-sheet between them.

I claim as my invention—

1. A printing-machine, in combination with a flier and automatic means for causing said flier to act only on certain predetermined sheets of those successively fed to it, substantially as described.

2. A printing-machine, in combination with a flier and automatic means for operating said flier upon the feed of every alternate sheet thereto, substantially as described.

3. A printing-machine, having traveling tapes, in combination with a flier, a latch, means for operating the flier and automatic means for operating said latch to prevent the operation of the flier at every alternate sheet's feed, substantially as described.

4. A printing-machine, having traveling tapes, a flier, a cam and means for operating the flier therefrom, a feed-roller, a latch, and means for operating said latch from the feed-roller, said last means being so timed in operation as to prevent the operation of the flier at the feed of every alternate sheet, substantially as described.

5. A printing-machine, having traveling tapes, a flier, a cam, and means for operating the flier therefrom, a feed-roller, cranks operated thereby, rods from said cranks, and a pivoted latch operated by the rods, said latch being adapted to prevent the operation of the flier when in latched position, and said cranks being timed as to cause the latching of said flier upon the feed of every alternate sheet, substantially as described.

In testimony whereof I affix my signature in presence of two witnesses.

THOMAS GEORGE HYDE.

Witnesses:
   GILBERT FLETCHER TYSON,
   WILLIAM GERALD REYNOLDS.